United States Patent
Suh

(10) Patent No.: US 10,775,230 B2
(45) Date of Patent: Sep. 15, 2020

(54) DISTRIBUTED ACOUSTIC SENSING SYSTEMS AND METHODS EMPLOYING MULTIPLE PULSE WIDTHS

(71) Applicant: Halliburton Energy Services, Inc., Houston, TX (US)

(72) Inventor: Kwang Suh, Los Angeles, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 352 days.

(21) Appl. No.: 15/754,139

(22) PCT Filed: Oct. 19, 2015

(86) PCT No.: PCT/US2015/056135
§ 371 (c)(1),
(2) Date: Feb. 21, 2018

(87) PCT Pub. No.: WO2017/069724
PCT Pub. Date: Apr. 27, 2017

(65) Prior Publication Data
US 2018/0238732 A1    Aug. 23, 2018

(51) Int. Cl.
*G01V 1/06*     (2006.01)
*G01H 9/00*    (2006.01)
(Continued)

(52) U.S. Cl.
CPC ........... *G01H 9/004* (2013.01); *E21B 47/135* (2020.05); *G01V 1/22* (2013.01); *G01V 1/226* (2013.01);
(Continued)

(58) Field of Classification Search
USPC .......................................................... 367/86
See application file for complete search history.

(56) References Cited

U.S. PATENT DOCUMENTS 6,874,361 B1    4/2005   Meltz et al.
7,668,411 B2 *  2/2010   Davies .................. G01H 9/004
                                                              385/12
(Continued)

FOREIGN PATENT DOCUMENTS

CA          2977253  A1    12/2010
CA          2816945  A      5/2012
(Continued)

OTHER PUBLICATIONS

Canadian Application Serial No. 2,995,348; Canadian Office Action; dated Apr. 5, 2018, 5 pages.
(Continued)

*Primary Examiner* — James R Hulka
(74) *Attorney, Agent, or Firm* — Gilliam IP PLLC

(57) ABSTRACT

A distributed acoustic sensing method that includes sending a sequence of optical pulses along an optical fiber, of at least two different widths, demodulating backscattered light from the optical fiber to obtain interferometric phase measurements as a function of position, combining the interferometric phase measurements to obtain a set of fade-resistant phase measurements, and storing or displaying the set of fade-resistant phase measurements. A distributed acoustic sensing system that includes a transmitter that sends a sequence of optical pulses along an optical fiber, of at least two different widths, a receiver that demodulates backscattered light from the optical fiber to obtain interferometric phase measurements as a function of position and combines interferometric phase measurements to obtain a set of fade-resistant phase measurements, and a storage or display device.

20 Claims, 15 Drawing Sheets

(51) Int. Cl.
*E21B 47/135* (2012.01)
*G01V 1/22* (2006.01)
*G01V 1/46* (2006.01)
*G01V 1/52* (2006.01)

(52) U.S. Cl.
CPC .......... *G01V 1/46* (2013.01); *G01V 1/52* (2013.01); *G01V 2210/123* (2013.01); *G01V 2210/1299* (2013.01); *G01V 2210/1429* (2013.01)

(56) References Cited

U.S. PATENT DOCUMENTS

| | | | |
|---|---|---|---|
| 7,764,363 | B2 | 7/2010 | Hayward et al. |
| 9,170,149 | B2 * | 10/2015 | Hartog .................... E21B 41/00 |
| 9,304,017 | B2 * | 4/2016 | Handerek .......... G01D 5/35358 |
| 9,476,760 | B2 * | 10/2016 | Brady .................... G01H 9/004 |
| 9,617,847 | B2 * | 4/2017 | Jaaskelainen ......... E21B 47/123 |
| 9,726,546 | B2 * | 8/2017 | Cedilnik .................... G01J 5/10 |
| 9,927,286 | B2 * | 3/2018 | Ikegami ................. G01H 9/004 |
| 10,018,558 | B2 * | 7/2018 | Yaman ................ G01M 11/085 |
| 10,466,172 | B2 * | 11/2019 | Yaman ................... G01K 11/32 |
| 2006/0115204 | A1 * | 6/2006 | Marsh .................. E21B 47/065 385/12 |
| 2009/0304322 | A1 | 12/2009 | Davies et al. |
| 2012/0060615 | A1 | 3/2012 | Farhadiroushan et al. |
| 2012/0067118 | A1 * | 3/2012 | Hartog .................... E21B 41/00 73/152.16 |
| 2012/0280117 | A1 | 11/2012 | Lewis et al. |
| 2013/0113629 | A1 | 5/2013 | Hartog et al. |
| 2015/0116124 | A1 | 4/2015 | Jaaskelainen et al. |

FOREIGN PATENT DOCUMENTS

| | | |
|---|---|---|
| WO | 2015030822 A1 | 3/2015 |
| WO | 2015112116 A1 | 7/2015 |

OTHER PUBLICATIONS

PCT Application Serial No. PCT/US2015/056135, International Search Report, dated Jul. 28, 2016, 3 pages.
PCT Application Serial No. PCT/US2015/056135, International Written Opinion, dated Jul. 28, 2016, 9 pages.
Canadian Application Serial No. 2,995,348; Office Action; dated Dec. 19, 2018, 4 pages.
Zhou, et al., "Characteristics and Explanations of Interference Fading of Φ-OTDR With a Multi-Frequency Source", Journal of Lightwave Technology, vol. 31, No. 17, retrieved on Jun. 15, 2020 from https://www.researchgate.net/publication/260453480_Characteristics_and_Explanations_of_Interference_Fading_of_a_-OTDR_With_a_Multi-Frequency_Source, Sep. 1, 2013, pp. 2947-2954.

* cited by examiner

DISTRIBUTED ACOUSTIC SENSING SYSTEMS AND METHODS EMPLOYING MULTIPLE PULSE WIDTHS

BACKGROUND

Fiber optic sensing systems have been developed employing a variety of techniques to provide distributed acoustic sensing ("DAS") of parameters such as vibration, acoustics, pressure, and temperature, even in hostile environments. Such systems have particular utility in hydrocarbon wells and other downhole environments where space is limited and other types of sensors exhibit sharply reduced reliability. However, fiber optic sensing systems have problems of their own, including interferometric fading and lack of quantitative accuracy.

For example, in a typical DAS system that monitors acoustic activity in multiple channels corresponding to different positions along the optical fiber, at least some of the monitored channels at any given time will exhibit fading due to Rayleigh scattering. All optical fibers have a distribution of impurities that each scatter a small fraction of passing coherent light pulses. The scattered portions of coherent light can interfere constructively or destructively with each other. As the distribution of impurities is perturbed, the degree of interference can be volatile and seemingly random. Where the interference is largely destructive, the signal from that portion of the fiber is suppressed, depleting the signal energy from that channel. The signal-to-noise ratio (SNR) drops, causing large errors and fringe jumping in the phase demodulation process. Typically, the effects are extremely localized, with nearby and even adjacent channels exhibiting no signal energy loss.

This phenomenon is not limited to fiber optic sensing systems. It also occurs in radio, satellite, and wireless communications, and can be particularly severe in heavily built-up urban environments. The prevalence of the issue has led to the construction of statistical models for "Rayleigh fading". Rayleigh fading models assume that the magnitude of a signal that has passed through such a transmission medium (also called a communications channel) vary randomly, fading according to a Rayleigh distribution that is expressible as the radial component of the sum of two uncorrelated Gaussian random variables. Existing DAS systems generally address Rayleigh fading by substantially lengthening the measurement period beyond the expected Rayleigh fade duration or averaging many measurements acquired over such an interval, but the requisite output delays may be unacceptable for many applications. As interference effects vary with wavelength (destructive interference tends to be very localized not only in space, but also in frequency), a proposed alternative approach employs measurements at multiple wavelengths and discarding measurements at those channels and wavelengths that exhibit fading. This alternative undesirably requires additional hardware complexity to collect measurements at multiple wavelengths.

BRIEF DESCRIPTION OF THE DRAWINGS

Accordingly, there are disclosed in the drawings and the following description distributed acoustic sensing systems and methods employing multiple pulse widths to reduce Rayleigh fading effects. In the drawings.

DETAILED DESCRIPTION

Figure 1:
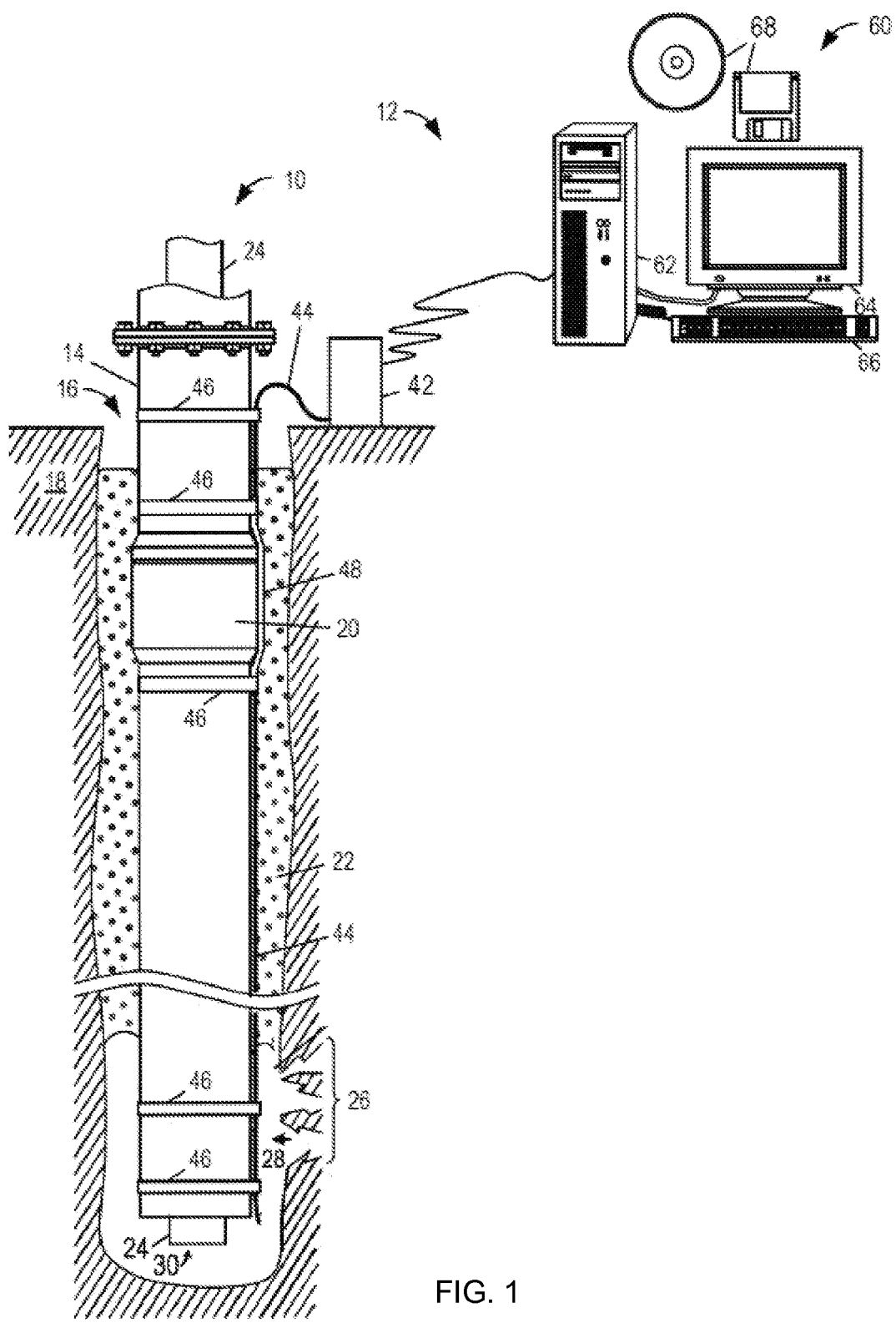
FIG. 1 shows an illustrative distributed acoustic sensing system in a production well.

The distributed acoustic sensing ("DAS") systems and methods disclosed herein are best understood in the context of an illustrative application. Accordingly, FIG. 1 shows a well 10 equipped with an illustrative embodiment of a distributed acoustic sensing system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections (with a standard length of 30 feet per section) connected end-to-end by couplings. One such coupling 20 is shown in FIG. 1. Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole 16 and thence to the surface via an opening 30 at the bottom of the production tubing string 24. Note that this well configuration is illustrative and not limiting on the scope of the disclosure.

The distributed downhole sensing system 12 includes an interface 42 coupled to an optical fiber cable 44 for distributed acoustic sensing of downhole temperature, pressure, and/or acoustic activity (vibration). The interface 42 is located on the surface of the earth 18 near the wellhead, i.e., a "surface interface". In the embodiment of FIG. 1, the optical fiber cable 44 extends along an outer surface of the casing string 14 and is held against the outer surface of the of the casing string 14 at spaced apart locations by multiple bands 46 that extend around the casing string 14. A protective covering may be installed over the optical fiber cable 44 at each of the couplings of the casing string 14 to prevent the cable 44 from being pinched or sheared by the coupling's contact with the borehole wall. In FIG. 1, a protective covering 48 is installed over the optical fiber cable 44 at the coupling 20 of the casing string 14 and is held in place by two of the bands 46 installed on either side of coupling 20.

In at least some embodiments, the optical fiber cable 44 terminates at surface interface 42 with an optical port adapted for coupling the optical fiber cable to a distributed acoustic sensing interrogator having a light source and a detector. In the illustrated embodiment, the interrogator is assumed to be part of the interface 42 and is not shown separately in the figure. In practice, the interrogator may be a separate, portable unit removably coupled to the interface 42. The light source transmits light pulses along the optical fiber cable 44, which contains scattering impurities. As the pulse of light propagates along the fiber, some of the pulse energy is scattered back along the fiber from every point on the fiber. The optical port communicates the backscattered light to the detector, which responsively produces electrical measurements of differences in backscattered light phase at each point in the fiber.

The illustrative distributed acoustic sensing system 12 of FIG. 1 further includes a computer 60 coupled to the surface interface 42 to control the interrogator and obtain distributed acoustic sensing measurements. The illustrated computer 60 includes a chassis 62, an output device 64 (e.g., a monitor as shown in FIG. 1, or a printer), an input device 66 (e.g., a keyboard), and non-transient information storage media 68 (e.g., magnetic or optical data storage disks). However, the computer may be implemented in different forms including, e.g., an embedded computer permanently installed as part of the interrogator, a portable computer that is plugged into the interrogator as desired to collect data, and a remote desktop computer coupled to the interrogator via a wireless link and/or a wired computer network. The computer 60 is adapted to receive the digitized measurement signals produced by the interrogator and to responsively determine a distributed parameter such as, e.g., distributed acoustic sensing along the length of the casing string.

The computer may be configured for application-specific operations by software stored, for example, on the information storage media 68 for execution by computer 60. The instructions of the software program may cause the computer 60 to collect phase differences of backscattered light derived from the electrical signal from surface interface 42 and, based at least in part thereon, to determine downhole parameters such as acoustic signals at each point along the fiber 44. The instructions of the software program may also cause the computer 60 to display the acoustic waveforms associated with each point along the fiber via the output device 64. The software may further provide a user interface that enables the user to configure operations of the interrogator including, for example, pulse width, pulse spacing, and measurement sampling rates.

Figure 2:
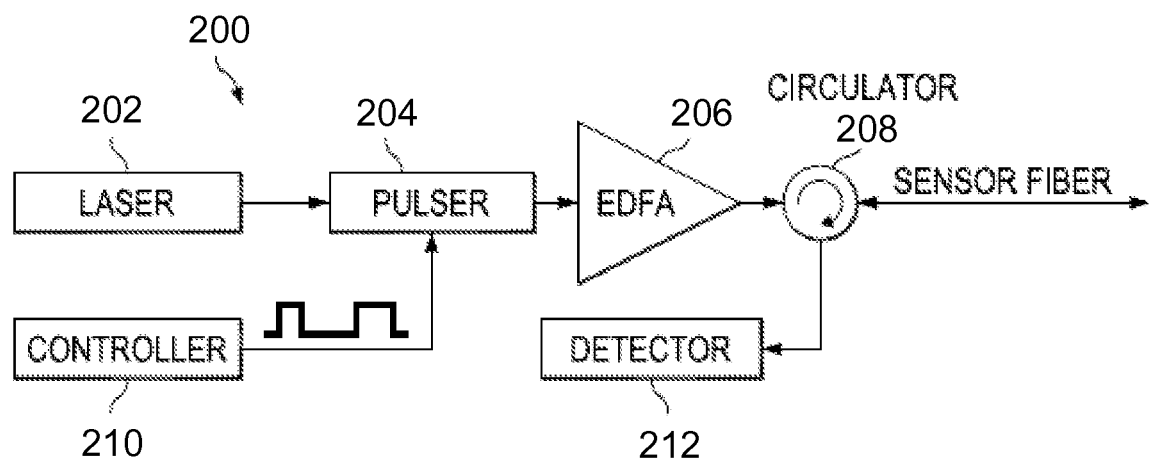
FIG. 2 is a schematic diagram of an illustrative single alternating pulse width wavelength system.

This disclosure proposes a new approach which is different from the previously-mentioned techniques by optically maintaining a single wavelength configuration. See FIG. 2 for a schematic diagram of an illustrative single alternating pulse width wavelength system 200. In this new approach, rather than trying to manipulate the wavelength (or frequency) of a laser transmitter 202, the width of the pulse is varied during generation and propagated through the DAS system. This can be easily done by feeding a pulser 204 with drive pulses of variable widths from a controller 210. The controller 210 produces alternating drive signals that are sent to the pulser 204 in order for the pulser to create alternative pulse width light signals employing different widths. The resultant light signal, with alternating pulse widths, is sent through an EDFA amplifier 206 and a circulator 208, also known as a receiver/transmitter, for emission through a sensor fiber. As the returned light is received by the circulator 208, the returned light is detected by a detector 212 and processed for information.

Figure 3A:
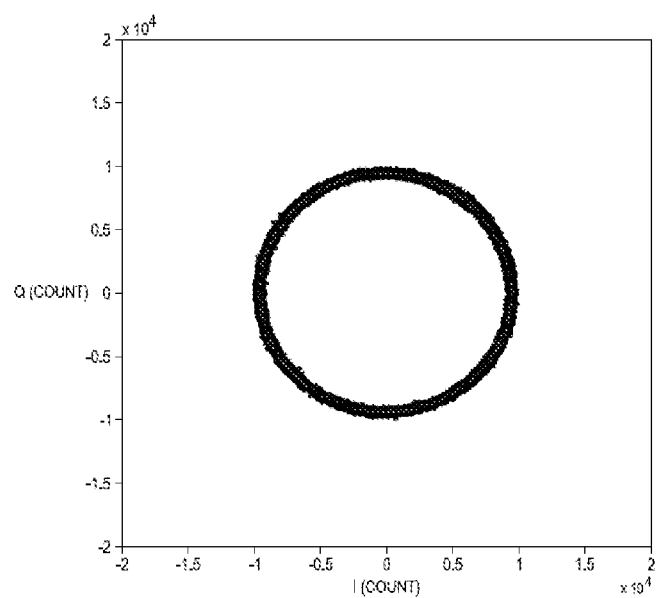
FIGS. 3A-3F are graphs of illustrative quadrature and phase plots.

The detector 212 senses quadrature data of the returned light signal. Quadrature data is comprised of a complex valued information that includes two values of interest: real value and an imaginary value, which can also be expressed as a magnitude value and a phase value of the returned light signal. The magnitude value is determined from the signal amplitude of the returned light signal while the phase value is determined by comparing the phase shift (or time delay) of the returned light signal as compared to the original transmitted light signal. This data, collected over time, is displayed in a quadrature plot as seen in FIG. 3A. A multitude of received light signals are stored and plotted onto the quadrature plot for further analysis.

Once the returned light signal has been received and processed for information, a set of interferometric phase measurements as a function of time and position is created. The operator may choose one or more of several options, including selecting the data from one particular pulse width value in a set of interferometric phase measurement over another, averaging two different set of interferometric phase measurements employing two or more alternating pulse width values, assigning a "weight" to each set of interferometric phase measurements and averaging the weighted sets together, comparing the interferometric phase measurements to a predetermined value for determination of optimal data quality, or by comparing at least two sets of interferometric phase measurements to a minimum threshold and modifying operations based on the results. Based on these actions, at least one set of fade-resistant interferometric phase measurements are created.

This "alternating pulse width" approach still has the disadvantage of having its usable bandwidth reduced by employing additional pulse widths, and it can create some spatial incoherence as two different pulse widths creates two different spatial profiles. However, this approach has a clear advantage of not having to add any components or increase data throughput to an existing single wavelength DAS configuration. Furthermore, when the difference in pulse width is small compared to the pulse width itself (e.g., <25%), the effect of spatial incoherence should be unnoticeable.

Figure 3B:
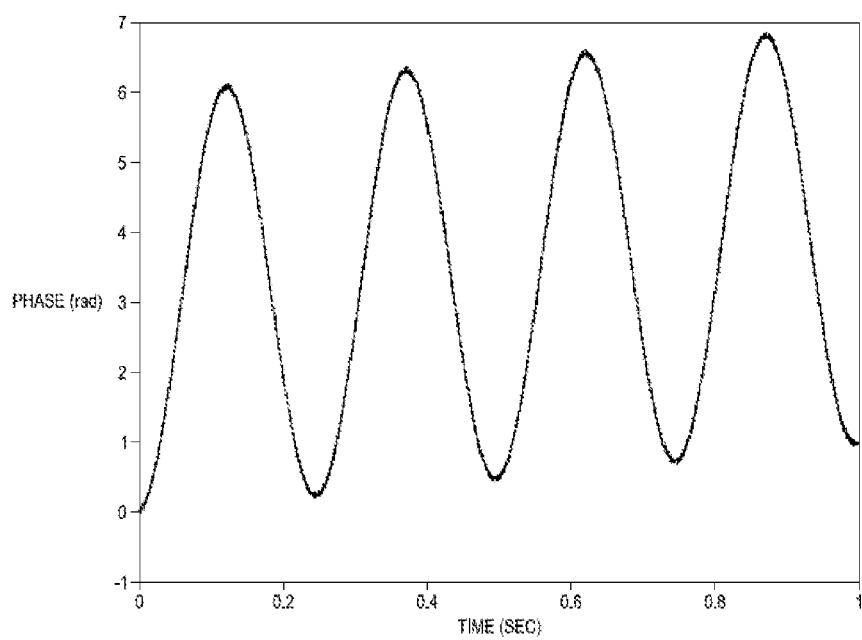
Figure 3C:
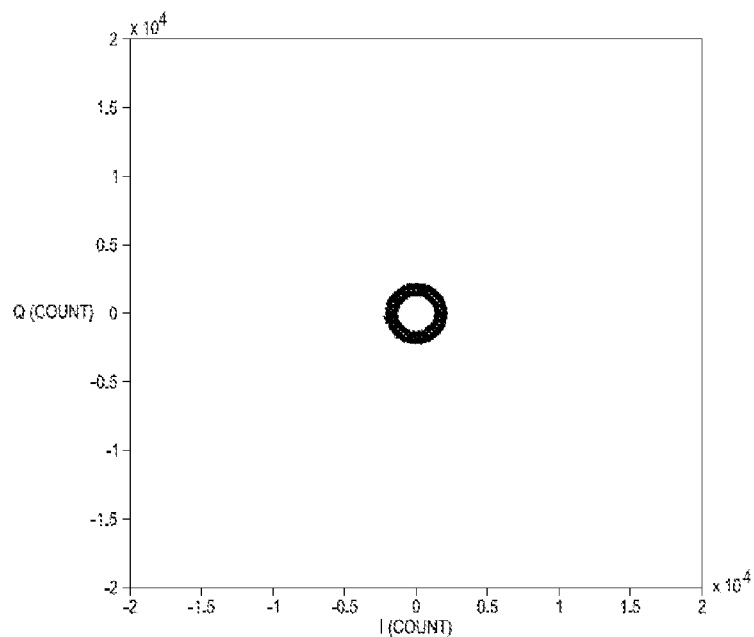
Figure 3D:
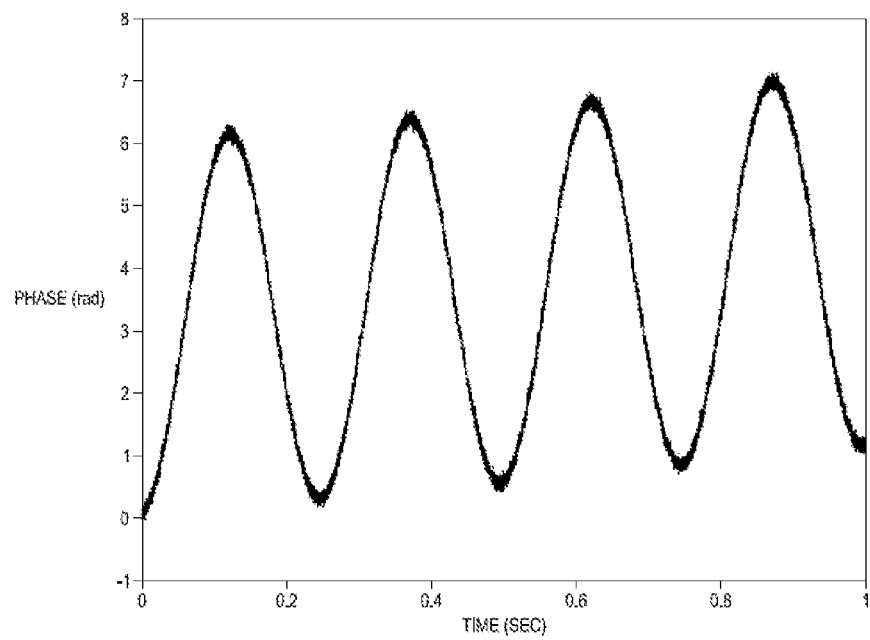
Figure 3E:
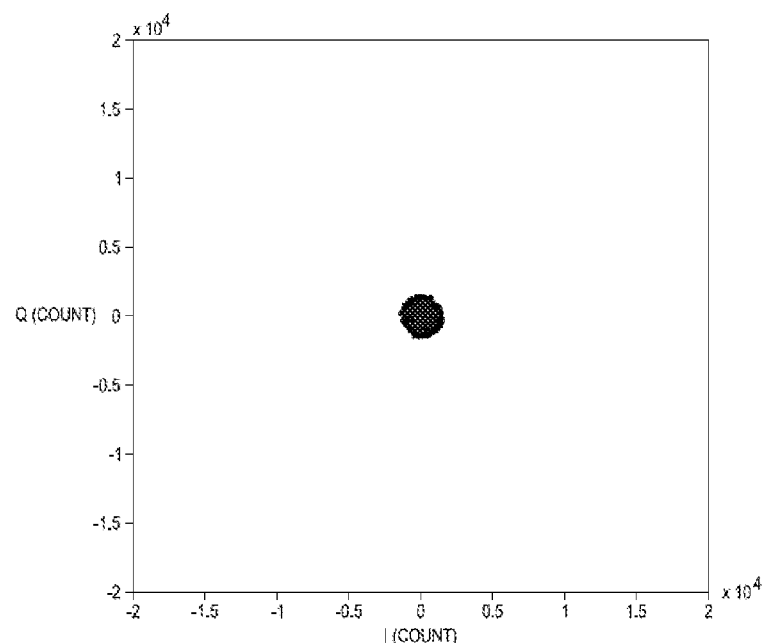
Figure 3F:
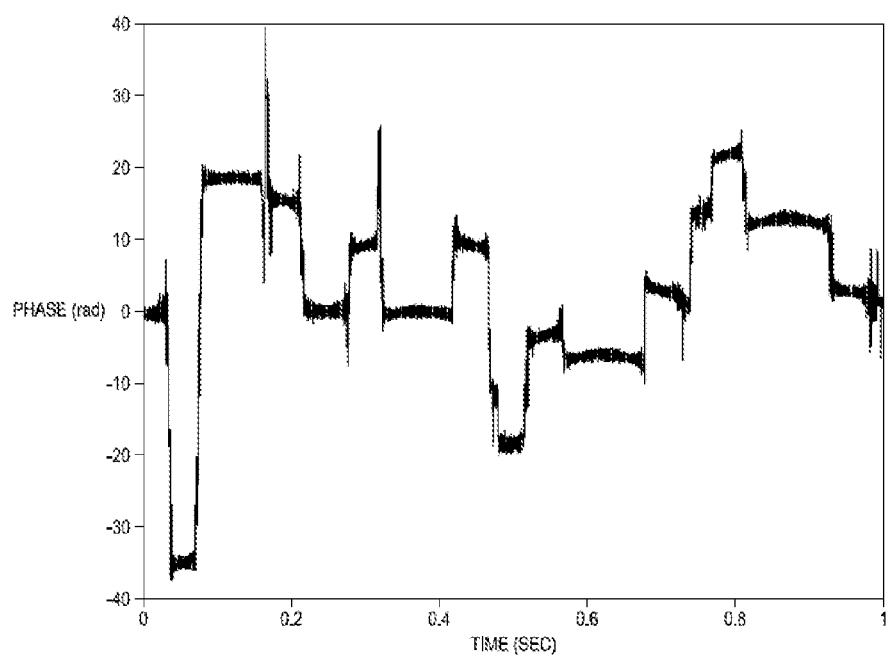

FIGS. 3A-3F are graphs of illustrative quadrature and phase plots. Quality of the phase data depends of the interferometric visibility, a normalized term which is defined by the ratio of interferometric signal to the overall signal of the returned signal. In terms of a quadrature plot, quality is directly related to the radius of the circle, with a larger value more desirable. FIG. 3A shows an example of a quadrature plot with a relatively large circle radius while FIG. 3B shows a corresponding phase plot in the time domain that is derived from the same data set as used to create FIG. 3A. Meanwhile, FIG. 3C shows a quadrature plot with a relatively small circle radius with the associated phase plot shown in FIG. 3D. Finally, FIG. 3E shows a quadrature plot with a minimal radius circle with the associated phase plot displayed in FIG. 3F.

Figure 4A:
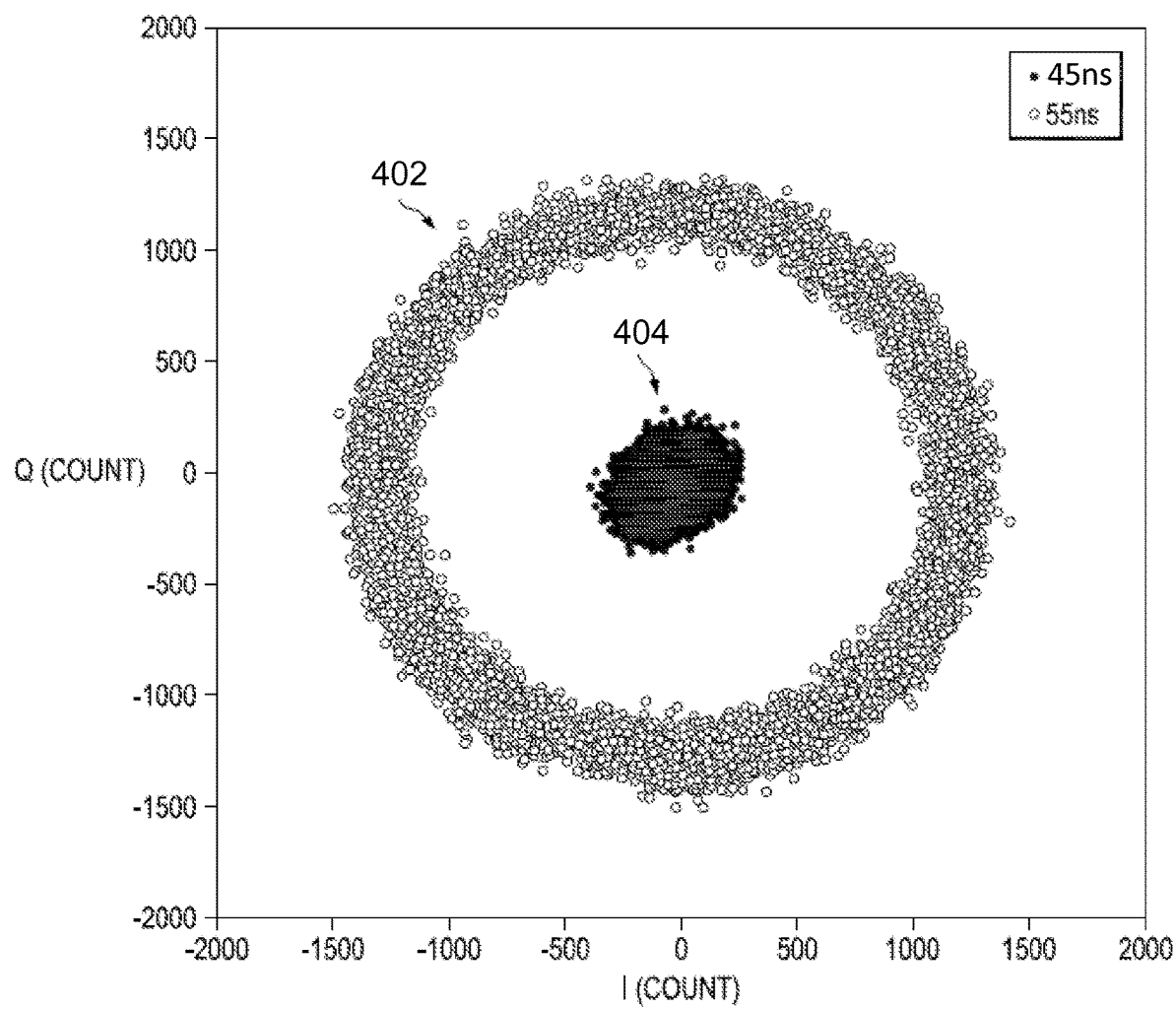
FIGS. 4A & 4B are graphs of illustrative quadrature and phase plots for two different pulse widths.
Figure 4B:
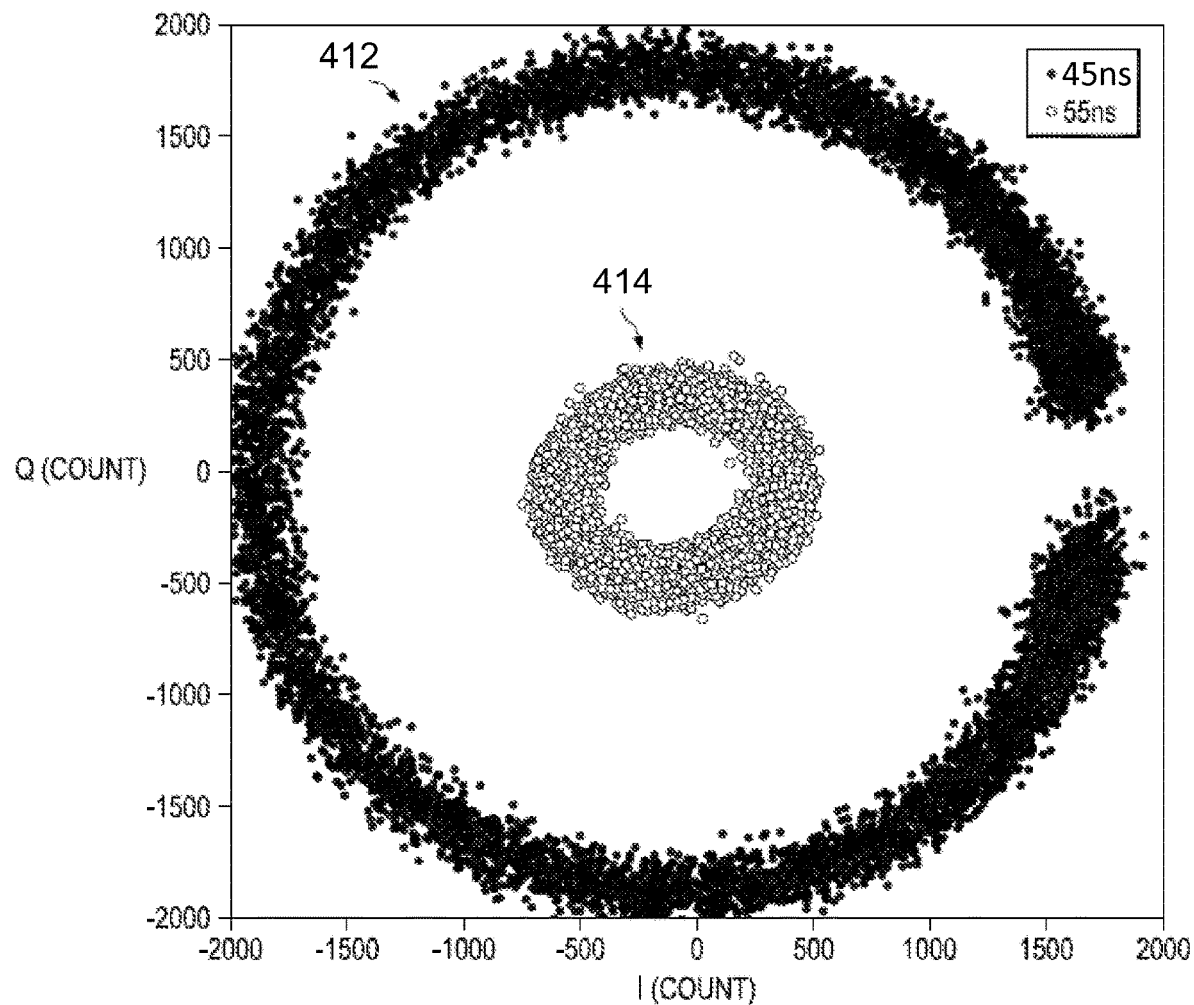

Viewing FIGS. 3A-3F, it is clear that the larger the radius of the quadrature circle, the better the phase data quality and hence the lower the noise. Therefore, it is in the best interest to maintain the returned signal quality as much as possible. Since the variation in signal quality across the sensing optical fiber is a naturally-occurring optical phenomenon, there is no obvious way to get around this issue after the data is collected. As discussed above, several different approaches have been proposed from the optical configuration aspect in an attempt to reduce the occurrence of the fading and to increase the overall signal quality. The alternating pulse width approach minimizes the effect of Rayleigh fading by using two or more pulse widths within a given period, collecting and plotting the resultant data for each pulse width, and selected the data with the best quality. FIGS. 4A and 4B shows two examples of the advantages of this approach.

FIGS. 4A and 4B are graphs of illustrative quadrature and phase plots for two different pulse widths (45 nm and 55 ns, respectfully). In this example, an experiment is conducted to determine the effectiveness of the proposed alternating pulse width approach. Two different widths of pulses are generated and propagated (45 ns and 55 ns) alternately along a sensing fiber, and the return signals are acquired, separated, and demodulated to generate two sets of quadrature and phase data. FIG. 4A shows quadrature circles from the same location generated by two different pulse widths of 45 ns and 55 ns. Returns from the DAS system employing a pulse width of 55 ns creates a "circle" of data with an approximate radius as seen in 402. Likewise, the data from applying a 45 ns pulse width is shown in 404. In FIG. 4B, a similar experiment is shown, with data from applying a 45 ns pulse width seen in 412 and data from using a 55 ns pulse width shown in 414.

As can be seen in FIGS. 4A and 4B, when one pulse width (either 45 ns or 55 ns) goes into fading (e.g., a reduction in quality or an increase in noise), the other pulse width data can be used to avoid the effect of fading. Further, the data with higher signal quality can be selected to enhance overall signal quality along the entire sensing optical fiber span. Other, more elaborate methods can be used for such a purpose, such as averaging with certain minimum threshold or weighted averaging with or without a threshold. As an example, the simple method of selecting the data with better quality (larger quadrature circle radius) may be used on the data to assess overall improvement.

Figure 5:
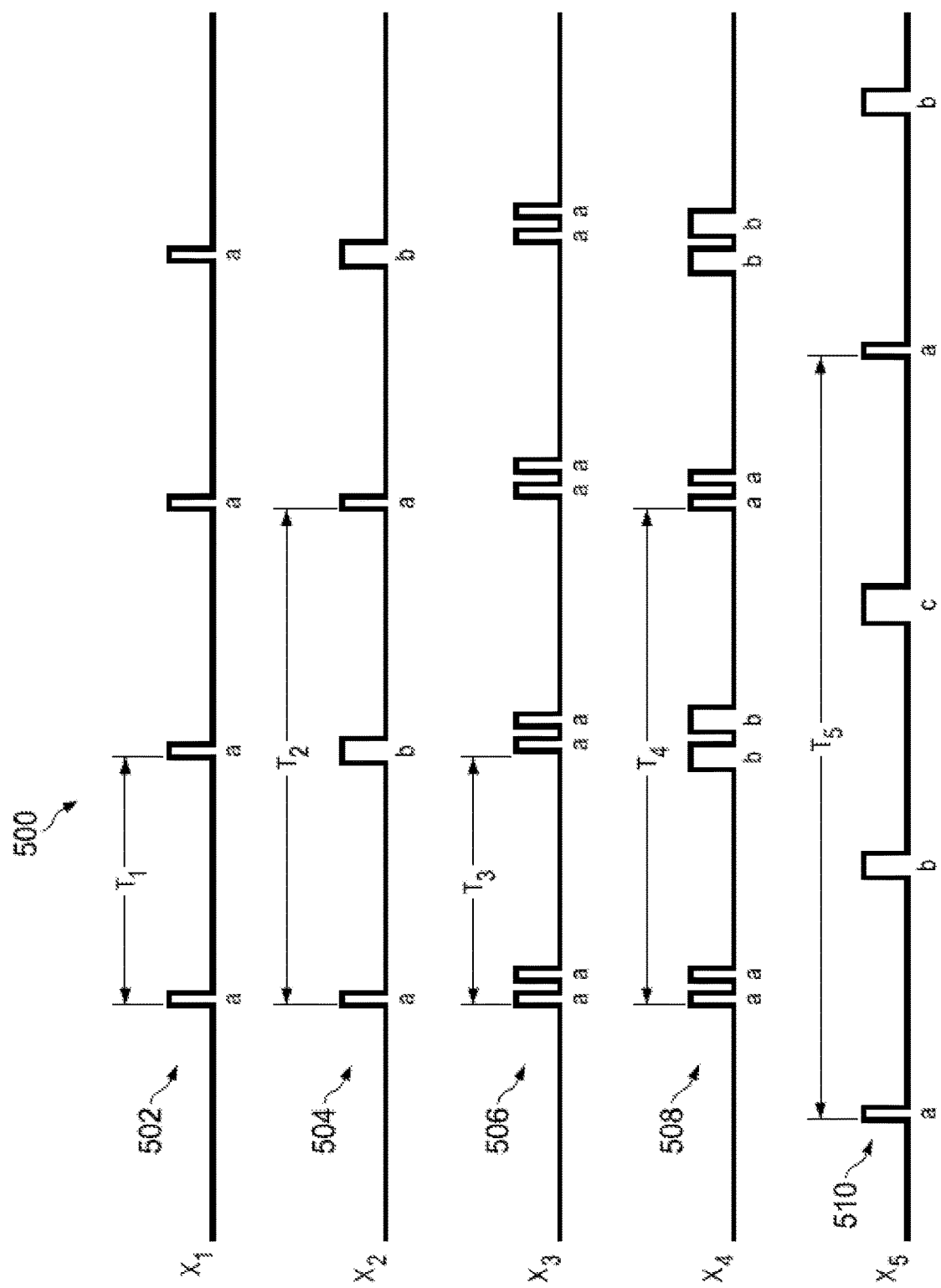
FIG. 5 shows plots of illustrative square waves employing alternating pulse widths.

FIG. 5 shows plots of various illustrative pulse width implementation signals 500, with each signal $x_1$-$x_5$ being a square wave signal having a period $T_1$-$T_5$, respectfully and pulse width(s) "a", "b", and/or "c". A given signal $x_n$ may include a single pulse width "a", dual pulse widths "a" and "b", triple pulse widths "a", "b", and "c", or even more pulse widths within a single period "$T_n$". The pulse width units are quantified in terms of time, typically in nanoseconds (ns). The total period "$T_n$" must be sufficiently long enough for the pulse width signal(s) to transit the entire length of the DAS optical fiber cable and return to the interface (located on the surface) for analysis. Furthermore, the period "$T_n$" must be extended whenever different pulse widths are used, as each pulse width must have sufficient time to transit through the optical fiber before the next pulse is transmitted (e.g., a signal $x_1$ that uses a single pulse width "a" that is 10 ns long may have a "$T_n$" value of 100 µs. Meanwhile, a signal $x_2$ that uses two pulse widths "a" that is 10 ns long and "b" that is 25 ns long may have a "$T_n$" value of 200 µs). Thus, when using multiple different pulse widths, period "$T_n$" is extended accordingly.

Pulse width values "a", "b", "c", etc. may be in any order and of any value consistent with the requirement that the sum of the pulse width(s), plus the required transit time for each pulse width to move to the end and back of the optical fiber cable, do not exceed the period "$T_n$". Thus, while the examples may show that pulse width "a" is larger than pulse width "b" and "c", there is no limitation on the relative values of "a", "b", and "c", or in which order they may be located relative to signal x.

A signal "x" may be further defined as employing a "single pulse system" or a "double pulse system". A single pulse system contains but one example of pulse width(s) "a", "b", and/or "c" for a given period while a double pulse signal contains two or more identical pulse widths for a given period. The signal $x_1$ (502 in FIG. 5) is an example of a single pulse system using a single pulse width. It is possible to have multiple pulse widths present in a single pulse system, but each pulse width is applied only once. A single pulse system uses a single light pulse in the optical fiber with a pulse width (or "on" time) that corresponds to the desired spatial resolution in a given application (e.g., a pulse width of 10 ns for 3 m resolution along an optical fiber). The "off" time corresponds to the time needed for the pulse to traverse the entire optical fiber cable in both directions (e.g., 20 us for an optical fiber 5-10 km long).

Meanwhile, a "double pulse system" includes using two identical pulses of equal duration, with the pulses small as compared to their spacing. It is possible to have multiple pulse widths present in a double pulse system, with each pulse width present twice within a single time period "$T_n$". Signal $x_3$ (506 in FIG. 5) is an example of a double pulse system. The spacing used corresponds to the spatial resolution (e.g., each pulse width being 2 ns spaced 10 ns apart in a signal with a period of 20 us).

A graph of a square wave signal $x_1$ using a "single pulse system" with a single pulse width of duration "a" is shown at 502. It should be noted that, while the square wave signal is of period "$T_1$", only the active "on" portion of the signal is carrying any information. As a rule, the shorter the pulse width duration, the less information is gathered. The total pulse width of signal $x_1$ 502 is "a" with a period of "$T_1$".

In graph 504, a square wave signal $x_2$ using a "single pulse system" includes two separate single pulse widths with one pulse width of duration "a" and a second pulse width of duration "b". Pulse widths "a" and "b" may be of any value; however, their combined values, plus the necessary transit times for each pulse to travel down and up the optical fiber cable must necessarily be less than or equal to period "$T_2$". Furthermore, for this disclosure, pulse widths "a" and "b" should be of different values. The total pulse width of signal $x_2$ 504 is "a+b" with a period of "$T_2$". Note that, due to employing 2 different pulse widths, the period "$T_2$" is approximately twice as long as "$T_1$".

In graph 506, a square wave signal $x_3$ using a "double pulse system" includes two identical pulse widths of duration "a". The total pulse width of signal 506 is "2a". When using the "double pulse system", both pulses travel together without waiting for the first pulse to travel along the optical fiber cable before the next pulse is transmitted. Accordingly, period "$T_3$" must only be equal to or larger than the sum of the two pulse widths plus the time necessary for the two pulses that transit the optical fiber cable. In a "double pulse system", it is not necessary to wait for the first pulse to travel along the optical fiber cable before transmitting the next pulse. Note that "T3" is approximately the same size as "$T_1$" since the two pulse widths in this example travel together.

In graph 508, a square wave signal $x_4$ using a "double pulse system" includes two different pulse widths of duration "a" and "b", with two sets of each pulse width present. The total pulse width of signal 508 is "2a+2b" with a period $T_4$. Note that "$T_4$" is approximately twice as long as "$T_1$" due to employing two different pulse width values.

In graph 510, a square wave signal $x_5$ using a "single pulse system" includes three single pulse widths of duration "a", "b", and "c". The total pulse width of signal 510 is "a+b+c" with a period of "$T_5$". Note that "$T_5$" is approximately 3 times as long as "$T_1$" due to 3 different pulse widths being used.

The choice of deciding whether to employ a "single pulse system", a "double pulse system", a single pulse width, or multiple pulse widths is usually a matter of architecture and the environment under which measurements are being made.

Furthermore, signal x may be a square wave, a sine wave, a triangular wave, etc. and is not limited to what is mentioned in this disclosure. It should be understood, however, that these examples of signal types and pulse widths for a given signal "x" are not limiting. On the contrary, many different types, numbers, and lengths of signals and pulse widths are possible and should not be limited by what is disclosed herein.

Figure 6A:
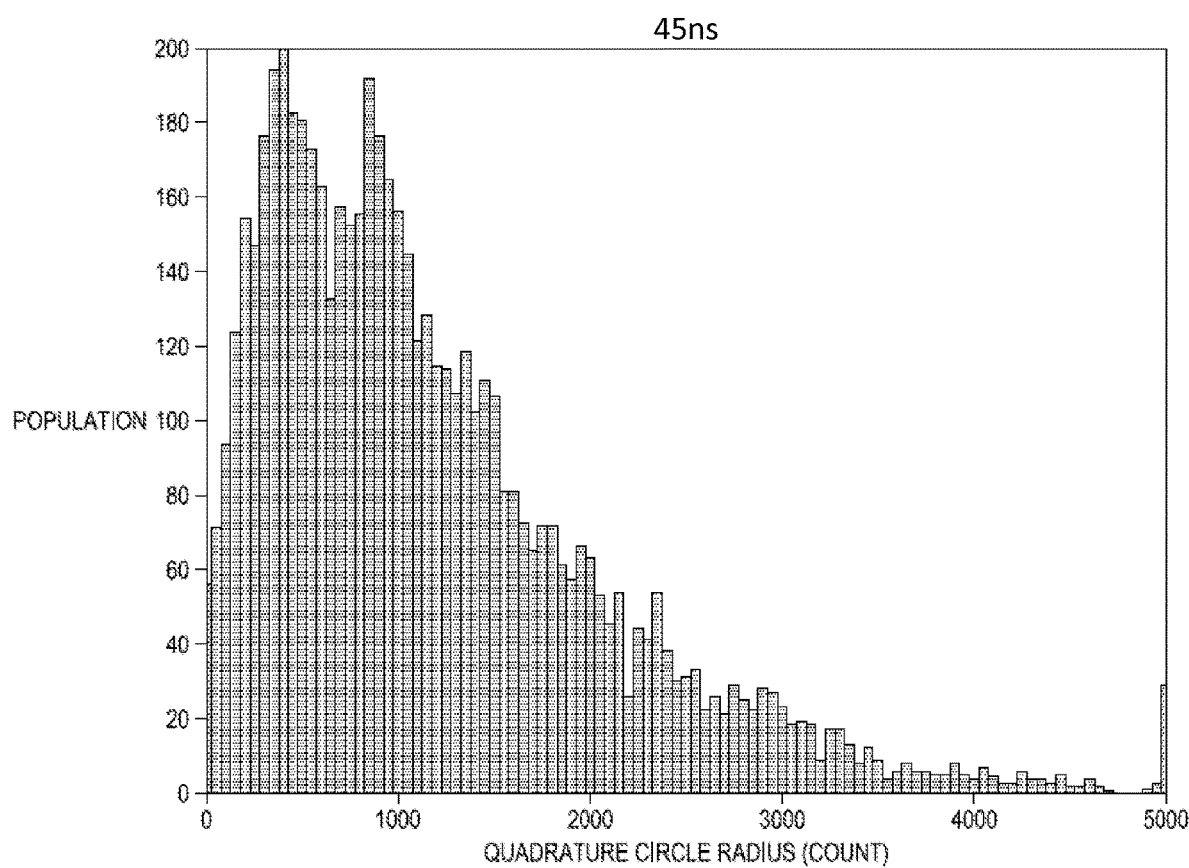
FIGS. 6A-6C are graphs of illustrative histograms of quadrature circle radii for various pulse widths.
Figure 6B:
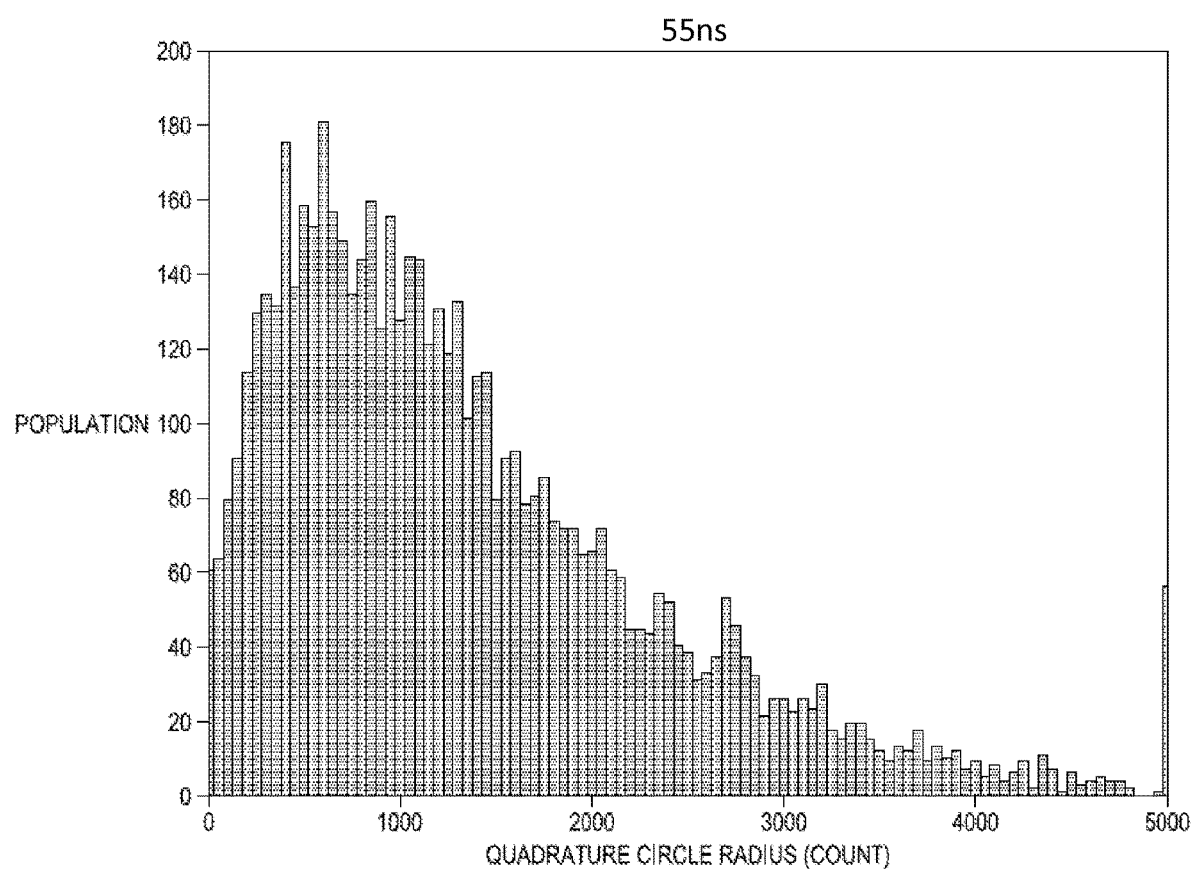
Figure 6C:
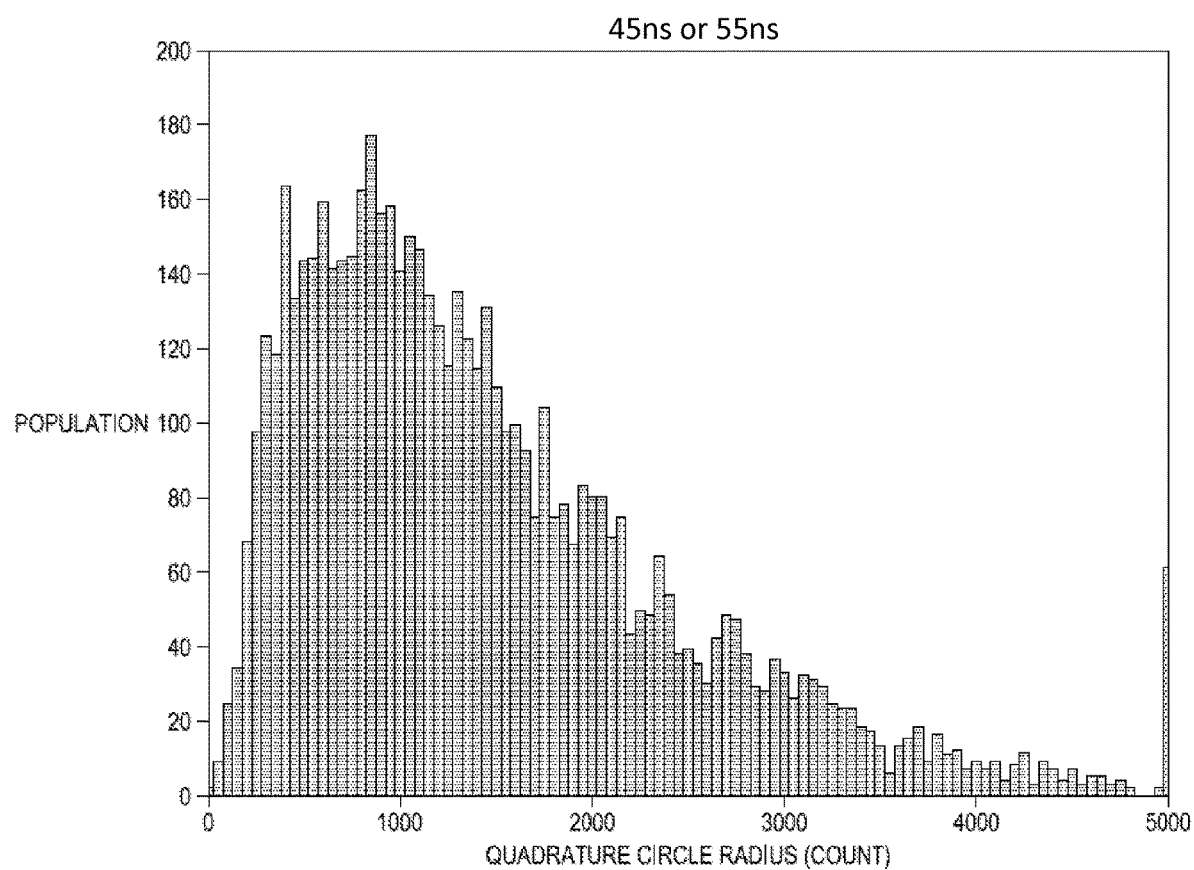
Figure 7A:
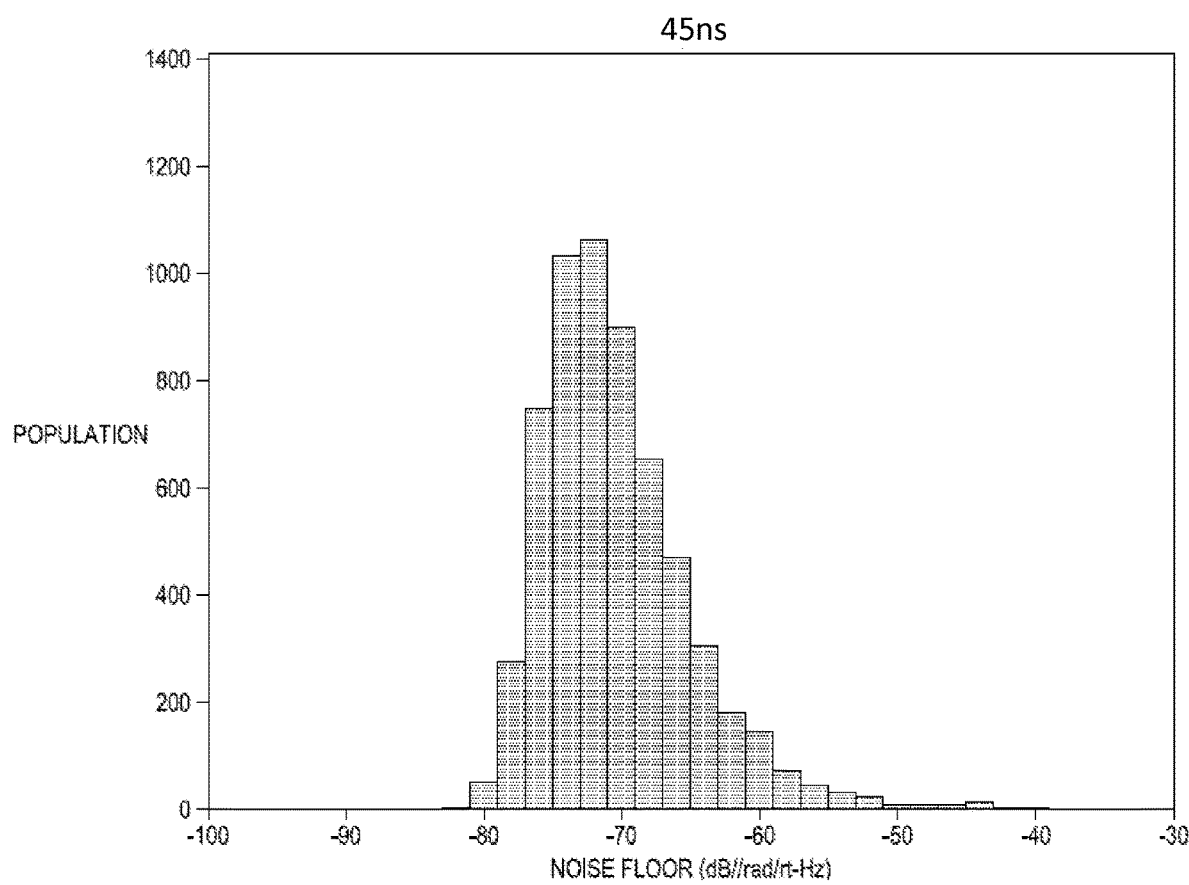
FIGS. 7A-7C are graphs of illustrative histograms of noise floor values for various pulse widths.
Figure 7B:
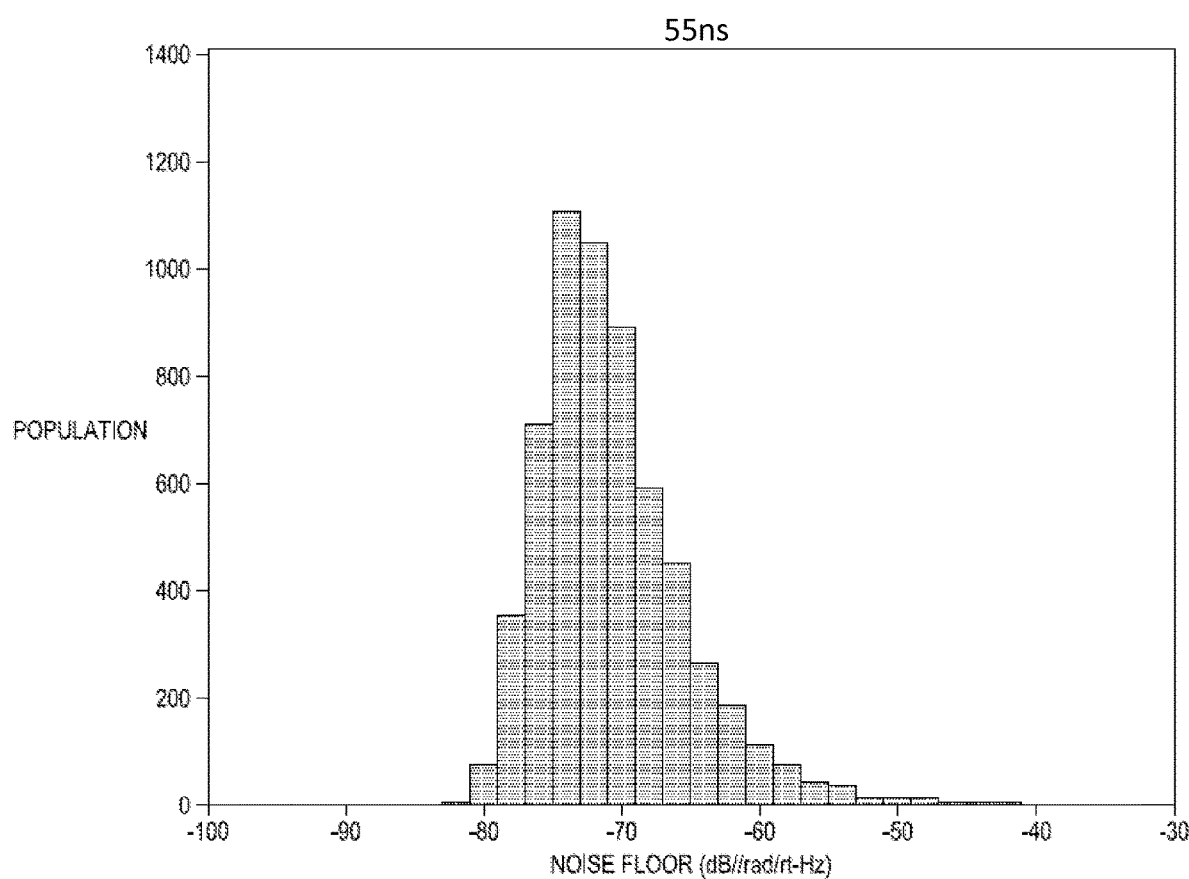
Figure 7C:
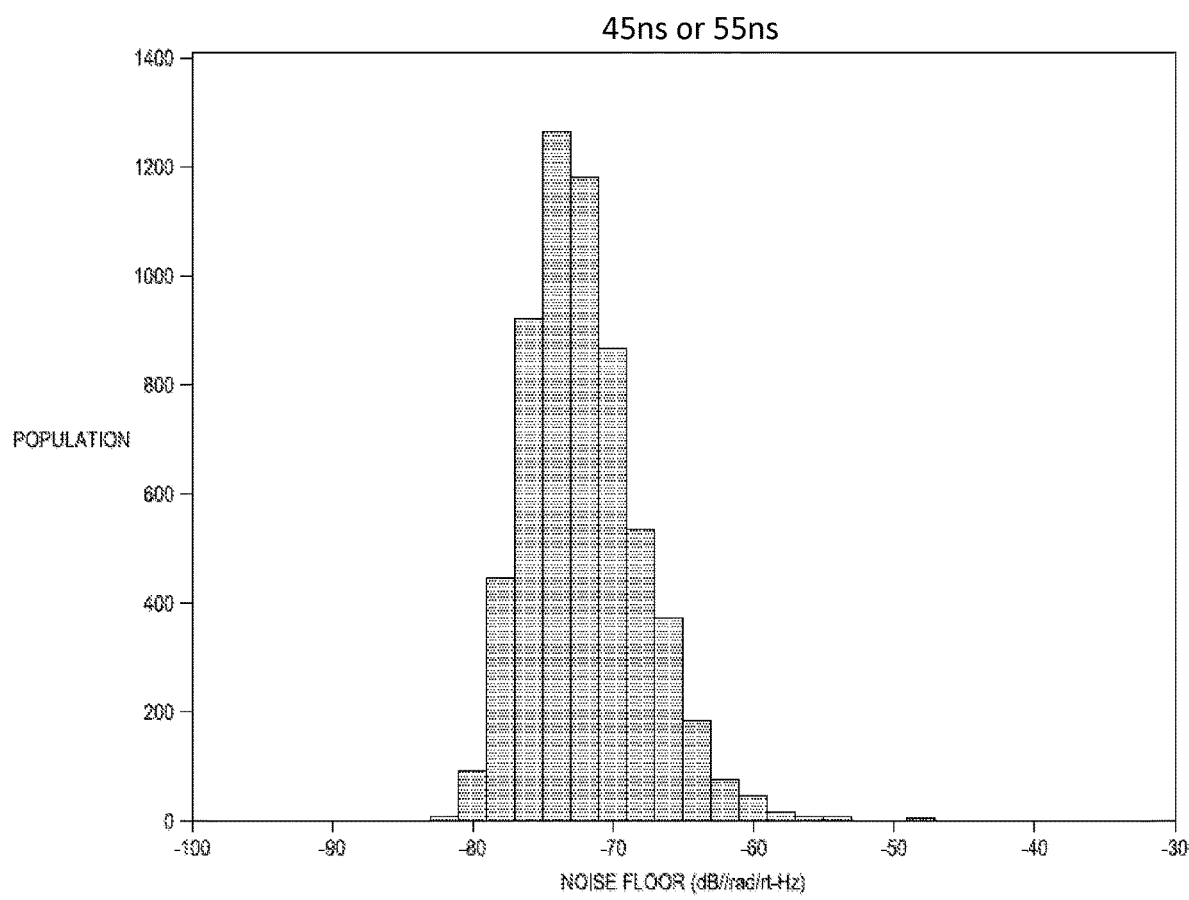

FIGS. 6A-6C are graphs of illustrative histograms of quadrature circle radii for pulse widths of 45 ns, 55 ns, and a combined graph, respectfully. To quantify the degree of improvement, histograms have been generated showing quadrature circle radius among three data sets: a 45 ns pulse width, a 55 ns pulse width, and a third set generated by selecting the best data from the first two histograms. From FIG. 6C, it can be seen that the number of channels with very small quadrature circles radius is significantly reduced by selecting better data between the two pulse width sets. Such reduction translates to better noise performance as shown in FIGS. 7A-7C in the histograms of noise floor calculation. The improvement is seen in reducing the number of channels with a high noise floor, and therefore this pulse width alternating approach can be useful in improving the signal quality of the channels that would otherwise be the noisiest part of the data.

FIGS. 7A-7C are graphs of illustrative histograms of noise floor values for various pulse widths. FIG. 7A is a histogram of noise floor calculation for a 45 ns pulse width, FIG. 7B uses a 55 ns pulse width, and FIG. 7C shows a combination of choosing the best data from FIGS. 7A and 7B. FIG. 7C shows an improvement in the ranges of approximately −65 dB to −45 dB. This reduction in noise is caused by reducing the number of channels with a high noise floor. Thus, employing an approach to choose between two different pulse width values contributes to a lower noise floor and improved signal quality.

Figure 8:
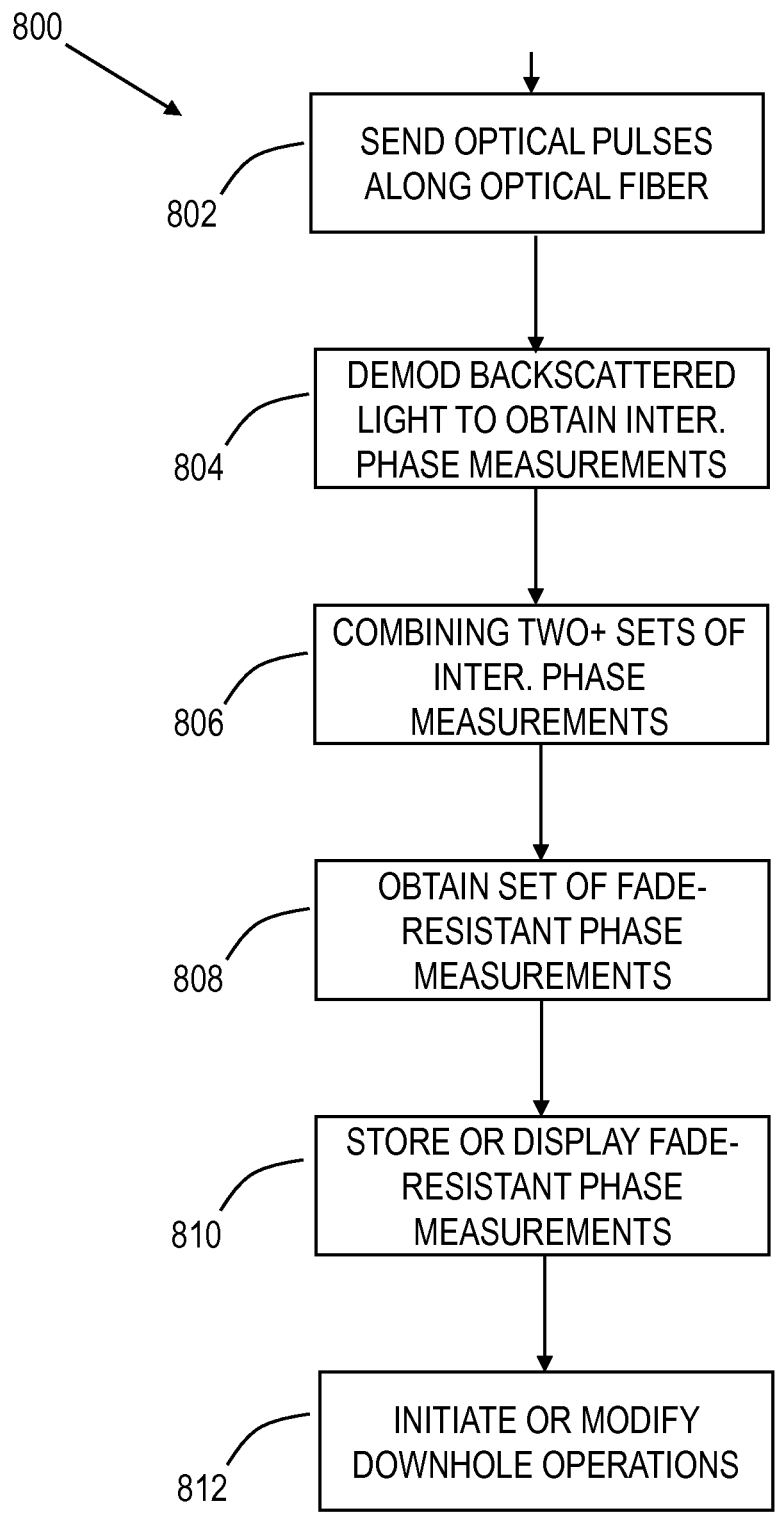
FIG. 8 is a flow block diagram of an illustrative distributed acoustic sensing method employing multiple pulse widths.

FIG. 8 is a flow block diagram of an illustrative distributed acoustic sensing method employing pulse width alternating sources.

In block 802, optical pulses are sent along an optical fiber. The optical pulses have been modified to employ alternating pulse widths, and incorporating either a single pulse width, a dual pulse width, or a multitude of unique pulse widths as required.

In block 804, the demodulated backscattered light is received and processed to obtain interferometric phase measurements.

In block 806, the system combines two or more sets of interferometric measurements in order to extract information concerning conditions downhole as measured by the DAS system.

In block 808, the received signals are processed by manipulating one or more alternating pulse width measurements to obtain a set of fade-resistant phase measurements.

In block 810, the system stores or displays the fade-resistant phase measurements.

In block 812, the operator initiates or modifies downhole operations based on the fade-resistant measurements. These options include, but are not limited to starting, stopping, or modifying drilling or pumping operations, adding proppants, additives, slurry, etc. to the wellbore, planning for additional perforation operations, etc.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Embodiments disclosed herein include:

A: A distributed acoustic sensing method that includes sending a sequence of optical pulses along an optical fiber, the sequence including pulses of at least two different widths; demodulating backscattered light from the optical fiber to obtain interferometric phase measurements as a function of position along the optical fiber; combining, for each position, at least two sets of interferometric phase measurements obtained in response to pulses of different widths to obtain a set of fade-resistant phase measurements; and storing or displaying the set of fade-resistant phase measurements.

B: A distributed acoustic sensing system, including a transmitter that sends a sequence of optical pulses along an optical fiber, the sequence including pulses of at least two different widths; a receiver that demodulates backscattered light from the optical fiber to obtain interferometric phase measurements as a function of position along the optical fiber; and combines, for each position, at least two sets of interferometric phase measurements obtained in response to pulses of different widths to obtain a set of fade-resistant phase measurements; and a storage or display device for storing or displaying the set of fade-resistant phase measurements.

Each of embodiments A and B may have one or more of the following additional elements in any combination: Element 1: further comprising initiating or modifying a downhole operation based on the set of fade-resistant phase measurements. Element 2: wherein the sequence of optical pulses is composed of a single pulse signal employing alternating widths. Element 3: wherein the sequence of optical pulses is composed of dual-pulse signal employing alternating widths. Element 4: wherein the sequence of optical pulses is generated by a controller module that produces alternating drive pulses with different widths. Element 5: wherein an operator chooses at least one width value based on the comparison of at least two sets of interferometric phase measurements. Element 6: wherein the at least two sets of interferometric phase measurements are averaged to generate a set of fade-resistant phase measurements. Element 7: wherein the at least two sets of interferometric phase measurements are averaged together using weighted average values. Element 8: wherein the at least two sets of interferometric phase measurements are compared to a predetermined threshold for determination of optimal data quality. Element 9: wherein the at least two sets of interferometric phase measurements are compared to a minimum threshold. Element 10: wherein the transmitter includes a controller module that creates an alternating drive pulse controller signal composed of at least two predetermined pulse width values. Element 11: wherein the controller module is controlled by an operator. Element 12: wherein the receiver is coupled to the optical fiber and includes at least one optical fiber coupler that produces one or more optical interferometric signals from the backscattered light. Element 13: wherein the one or more optical interferometric signals are used to calculate interferometric phase measurements. Element 14: wherein an operator chooses at least one pulse width value based on the comparison of the at least two sets of interferometric phase measurements. Element 15: wherein the at least two sets of interferometric phase measurements are averaged to generate a set of fade-resistant phase measurements. Element 16: wherein the at least two sets of interferometric phase measurements are averaged together using weighted average values. Element 17: wherein the at least two sets of interferometric phase measurements are compared to a predetermined threshold for determination of optimal data quality. Element 18: wherein the at least two sets of interferometric phase measurements are compared to a minimum threshold. Element 19: further comprising initiating or modifying a downhole operation based on the set of fade-resistant phase measurements.

What is claimed is:

1. A distributed acoustic sensing method that comprises:
   sending a sequence of optical pulses along an optical fiber, the sequence including pulses of at least two different widths, wherein the at least two pulse widths are sent alternately along the optical fiber;
   demodulating backscattered light from the optical fiber to obtain interferometric phase measurements as a function of position along the optical fiber;
   combining, for each position, at least two sets of interferometric phase measurements obtained in response to pulses of different widths to obtain a set of fade-resistant phase measurements; and
   storing or displaying the set of fade-resistant phase measurements.

2. The method of claim 1, further comprising initiating or modifying a downhole operation based on the set of fade-resistant phase measurements.

3. The method of claim 1, wherein the sequence of optical pulses is composed of a single pulse signal employing alternating widths.

4. The method of claim 1, wherein the sequence of optical pulses is composed of dual-pulse signal employing alternating widths.

5. The method of claim 1, wherein the sequence of optical pulses is generated by a controller module that produces alternating drive pulses with different widths.

6. The method of claim 1, wherein an operator chooses at least one width value based on the comparison of at least two sets of interferometric phase measurements.

7. The method of claim 1, wherein the at least two sets of interferometric phase measurements are averaged to generate a set of fade-resistant phase measurements.

8. The method of claim 1, wherein the at least two sets of interferometric phase measurements are averaged together using weighted average values.

9. The method of claim 1, wherein the at least two sets of interferometric phase measurements are compared to a predetermined threshold for determination of optimal data quality.

10. The method of claim 1, wherein the at least two sets of interferometric phase measurements are compared to a minimum threshold.

11. A distributed acoustic sensing system, comprising:
    a transmitter that sends a sequence of optical pulses along an optical fiber, the sequence including pulses of at least two different widths, wherein the at least two pulse widths are sent alternately along the optical fiber;
    a receiver that,
       demodulates backscattered light from the optical fiber to obtain interferometric phase measurements as a function of position along the optical fiber, and
       combines, for each position, at least two sets of interferometric phase measurements obtained in response to pulses of different widths to obtain a set of fade-resistant phase measurements; and
    a storage or display device for storing or displaying the set of fade-resistant phase measurements.

12. The system of claim 11, wherein the transmitter includes a controller module that creates an alternating drive pulse controller signal composed of at least two predetermined pulse width values.

13. The system of claim 11, wherein the receiver is coupled to the optical fiber and includes at least one optical fiber coupler that produces one or more optical interferometric signals from the backscattered light.

14. The system of claim 13, wherein the one or more optical interferometric signals are used to calculate interferometric phase measurements.

15. The system of claim 11, wherein an operator chooses at least one pulse width value based on the comparison of the at least two sets of interferometric phase measurements.

16. The system of claim 11, wherein the at least two sets of interferometric phase measurements are averaged to generate a set of fade-resistant phase measurements.

17. The system of claim 11, wherein the at least two sets of interferometric phase measurements are averaged together using weighted average values.

18. The system of claim 11, wherein the at least two sets of interferometric phase measurements are compared to a predetermined threshold for determination of optimal data quality.

19. The system of claim 11, wherein the at least two sets of interferometric phase measurements are compared to a minimum threshold.

20. The system of claim 11, further comprising initiating or modifying a downhole operation based on the set of fade-resistant phase measurements.

* * * * *